United States Patent [19]
Ando

[11] 3,752,930
[45] Aug. 14, 1973

[54] TELEPHONE SPEECH RECORDING DEVICE

[75] Inventor: Shizoo Ando, Kalsushika-ku, Tokyo, Japan

[73] Assignee: Pioneer Electric Corporation, Tokyo, Japan

[22] Filed: May 5, 1972

[21] Appl. No.: 250,549

[52] U.S. Cl. .................. 179/6 R, 179/1 C, 307/156
[51] Int. Cl. .............................................. H04m 1/64
[58] Field of Search .................... 179/6 R, 6 C, 6 E, 179/1 C, 2 C; 307/156

[56] References Cited

UNITED STATES PATENTS

| | | | |
|---|---|---|---|
| 2,528,459 | 10/1950 | Thompson et al. | 179/6 R |
| 2,399,961 | 5/1946 | Van Deventer | 179/6 R |
| 1,612,363 | 12/1926 | Dorfman | 307/156 |

Primary Examiner—Raymond F. Cardillo, Jr.
Attorney—Richard C. Sughrue et al.

[57] ABSTRACT

A telephone recorder including a single relay having two windings. The first winding is connected in series with the telephone and the telephone line. Since there is no d.c. path through the first winding until the telephone receiver is picked up, telephone call or ringing signals do not operate the relay. However, when the receiver is picked up, the relay is energized to close contacts to initiate operation of the recorder. Speech signals on the telephone line pass through the first relay winding and are induced into the second relay winding which is connected to the recording amplifier of the recorder.

3 Claims, 1 Drawing Figure

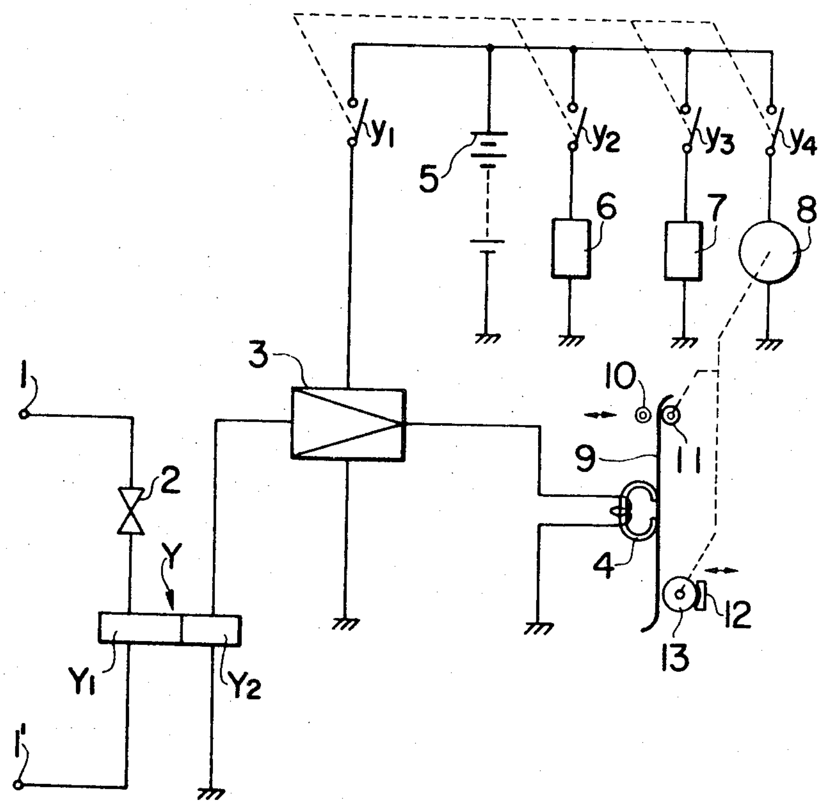
y1
y2
y3
y4
5
6
7
8
3
1
10
11
9
2
Y
4
12
13
Y1
Y2
1'

TELEPHONE SPEECH RECORDING DEVICE

BACKGROUND OF THE INVENTION

1. Field of the Invention

This invention relates to devices for recording speech transmitted over a telephone line.

2. Description of the Prior Art

The most popular type of conventional devices for recording sound on a telephone line has included both a means for detecting that the receiver has been removed from a telephone set and also a means for picking up sound signals after the detecting means has been operated; and then the sound signals were recorded on a suitable recorder. However, such a conventional telephone speech recording device has the disadvantages that it must be large because of the aforementioned two means included therein, and also that it has low reliability, again because it is composed of these two separate means. Furthermore, since the conventional telephone speech recording device must be attached directly to the telephone set, it may be rather troublesome to set up.

SUMMARY OF THE INVENTION

The device of the present invention has been made with the intention of overcoming the above-described disadvantages. Accordingly, an object of this invention is to provide a telephone speech recording device in which only one means is required both to detect that the telephone line circuit is operatively closed, as well as to pick up sound signals transmitted over the telephone line.

A further object of this inventiวn is to provide a telephone speech recording device which may be connected to a telephone line without the need for making any additional change in the telephone set or for attaching any adaptor thereto.

A still further object of this invention is to provide a telephone speech recording device which can be manufactured as a compact and low-priced device, which enables telephone speech recording merely by connecting a simple means to a telephone line, and which can be attached to a telephone set much more easily than the conventional devices.

More specifically, this invention provides a telephone speech recording device comprising a two-winding relay having a first winding which is connected in series with a telephone line, and a recording circuit whose input terminals are connected to the second winding of the two-winding relay so as to operate the recording circuit in accordance with the operation of the relay.

BRIEF DESCRIPTION OF THE DRAWING

The single FIGURE is a schematic diagram of a preferred embodiment of the invention.

DESCRIPTION OF THE PREFERRED EMBODIMENT

A preferred embodiment of this invention will be described below with reference to the accompanying drawing.

In the drawing, 1, 1' are terminals for connection to a telephone line (not shown), 2 is a telephone set connected between terminals 1, 1' and Y is a two-winding relay having a first winding $Y_1$, a second winding $Y_2$ and four contacts $y_1 - y_4$ which are operated when current having a value more than a predetermined value flows through at least either winding $Y_1$ or winding $Y_2$.

The first winding $Y_1$ is connected between terminal 1' and telephone set 2, and the second winding $Y_2$ is connected to ground at one end thereof and at the other end thereof to the input terminal of an amplifier 3, the output terminal of which is connected to a magnetic head 4. Amplifier 3 is connected to a d.c. source 5 through the first contact $y_1$ of the two-winding relay Y. 6 is a plunger for moving a pinch roller 10 toward a capstan 11 and is connected to source 5 through the second contact $y_2$ of relay Y. 7 is a plunger for releasing a brake member 12 for the recorder reels 13 and is connected to source 5 through the third contact $y_3$ of the relay Y. 8 is a motor for transporting tape 9 and is connected to source 5 through the fourth contact $y_4$ of relay Y.

In operation, when call or ringing signals (usually, a.c. signals of 16 Hz) are transmitted over the telephone line to be supplied to terminals 1, 1', the call bell of telephone set 2 is caused to ring. At that time, since a d.c. path is not yet closed in telephone line, only a.c. signals, i.e., the call signals, flow through the first winding $Y_1$ of the two-winding relay Y, so that the relay is energized either in a vibratory manner or else makes no response at all to the call signals, thereby remaining unoperated. Then, if the listener picks up the receiver of telehone set 2, a talking path is established, and at this time a d.c. path in telephone line is closed so that direct current flows through the first winding $Y_1$ of two-winding relay Y. Accordingly, relay Y is now energized and is maintained in a stable operation, and thereby the four contacts $y_1 - y_4$ are closed. Thus, amplifier 3 is operated and the sound signals passing through the first winding $Y_1$ of two-winding relay Y are induced into the second winding $Y_2$ thereof, amplified by amplifier 3 and then supplied to magnetic head 4. Furthermore, the closing of the three contacts $y_2 - y_4$ energizes plungers 6 and 7 and the motor 8 so that the pinch roller 10 is pressed against capstan 11, the brake member 12 is released, and the tape 9 begins to run, thereby recording the sound signals transmitted through the telephone line. As described above, the recording state is established only at the time when the listener picks up the receiver of the telephone set, thereby eliminating unnecessary operation of the recorder.

In addition, even if the two-winding relay Y is vibratorily energized by the call signals to cause activating of the contacts, the recording state is substantially un-established, because plungers 6 and 7 and motor 8 have sufficient inertia not to be operated by the oscillations of the relay.

However, if the talker picks up the receiver of telephone set 2 and turns the dial, the recording state may be established in the same manner as described above since a d.c. path through the telephone line is closed by the picking up of the receiver. In this case, the dial pulses are recorded and the talking with the listener is of course also recorded. The recording of the dial pulses also has the advantage of later determining the telephoned number by the use of a simple counter.

As described above, according to this invention, the first winding of a two-winding relay is connected to a telephone line and, when a d.c. path through the telephone line is closed, the relay is energized to set a recording means into a recording state and simultaneously the sound signals transmitted over the telephone line are induced in the second winding through the first winding, and accordngly the sound signals are recorded on the recording means. Thus, a single relay provides both the detection of the closing of the telephone line circuit as well as the pick-up of the sound signals transmitted over the telephone line. The telephone speech recording device according to this invention can be manufactured to be more compact and lower priced than the conventional recorders in which the detection of the closing of the telephone line and the pick-up of sound signals are performed by separate means. Furthermore, since the relay is attached directly to the telephone line, it is unnecessary to make any additional change in the telephone set so that the telephone speech recording device of this invention is able to be set up much more easily. The direct current which energizes the relay is the ring relay trip current supplied from the telephone central office.

While the invention has been particularly shown and described with reference to a preferred embodiment thereof, it will be understood by those skilled in the art that various changes in form and details may be made therein without departing from the spirit and scope of the invention.

What is claimed is:

1. In a telephone recorder for automatically recording sound signals transmitted between a telephone line and a telephone connected to the line, the improvement comprising:

a. a single relay having inductively coupled first and second windings, b. means for connecting said first winding in series with said line and said telephone, and c. a normally inoperative recording circuit connected to said second winding, said relay being responsive to the formation of a direct current path through said line, said telephone and said first winding for operating said recording circuit, whereby sound signals on said line are induced from said first winding into said second winding and applied to the operating recording circuit.

2. The improved telephone recorder as defined in claim 1 wherein said telephone comprises a removable receiver and means responsive to the removal of said receiver for forming said direct current path.

3. The improved telephone recorder as defined in claim 1, further comprising:

a. a power source, b. normally unenergized control means for operating said recorder, and c. normally open contact means connected between said power source and said control means and said recording circuit, said relay being responsive to the formation of said direct current path to close said contact means, thereby operating said recording circuit and energizing said control means to operate said recorder.

* * * * *